Figure 1:
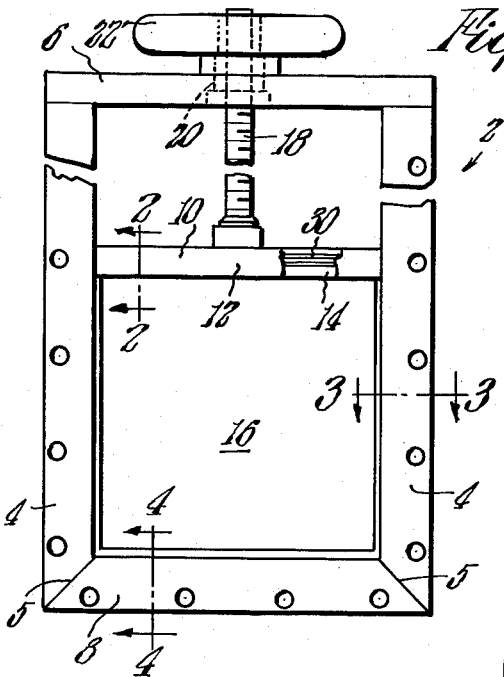

May 16, 1961 D. E. LE CLAIR ET AL 2,984,074
SLUICE GATE
Filed March 26, 1959

INVENTORS
Robert H. Reinert and
BY Donald E. LeClair
Ross & Ross, Atty.

United States Patent Office 2,984,074
Patented May 16, 1961

2,984,074
SLUICE GATE

Donald E. Le Clair, Fairview, and Robert H. Reinert, Indian Orchard, Mass., assignors, by mesne assignments, to The Chapman Valve Manufacturing Company, Chicago, Ill., a corporation of Delaware Filed Mar. 26, 1959, Ser. No. 802,072

2 Claims. (Cl. 61—28)

The present invention relates to new and useful improvements in structural refinements in a sluice gate and is directed more particularly to the provision of a sluice gate which is constructed and arranged for ease of operation and to an improvement in the means for tightly sealing the gate in its frame or support in a closed position thereof.

The invention resides in the particular arrangement, construction and relationship of the various elements of the sluice gate as exemplified in the detailed disclosure hereinafter set forth wherein the objects of the invention as defined in the paragraphs below will be apparent.

It is a principal object of the present invention to provide a novel and improved construction of the type in which a novel sealing means obviates leakage past the gate and there is the further provision of an elimination of interfitting parts of close tolerances so as to avoid the objectionable inconveniences now present in the prior art.

Another of the primary purposes hereof is to provide advantageous structural and operational features in a device of the class to which reference has been made leading to its simplicity in construction, its adaptability to economical manufacture and its efficiency and dependability in operational use, and providing important distinct advantages in durability, efficiency, ease of operation and the like.

In a broad way, the invention can be considered to relate to a sealing means for a slidable member in a sluice gate.

As conducive to an understanding of the invention, it is noted that where a gate is slidably mounted in a frame to define fluid chambers on opposed sides thereof, the pressures created may be such that unwanted fluid may leak past the gate from one chamber to the other with resultant harmful consequences.

It is accordingly among the objects hereof to provide a sealing means which is simple in construction, yet is durable and not likely to become deranged even with long use and which is so designed that at substantially all times in normal operation of the unit, a dependable seal will be provided between the two fluid chambers which will substantially preclude leakage of fluid under pressure from one chamber to the other.

Another primary object hereof is to provide a device having the following inherent meritorious characteristics: first, the securement of a higher degree of accuracy and greater degree of variety in the manner of work performed therewith than has heretofore been possible with prior devices known in the art; second, the attainment of an improved apparatus wherein the components are coordinated for facile assembly and wherein the resultant structure is capable of more dependable operation than devices heretofore known; third, the attainment of a more economical and higher speed of construction and assembly of the device due to its simplification of design and its unique composition of coacting parts; fourth, the attainment of a flexibility or a capability of adjustment by which a large variety of work can be produced by means of the same device; fifth, the achievement of a greater ease in repairs than has been possible in related devices heretofore known; sixth, the provision of a construction which may be readily installed with respect to the various purposes for which it is intended, and seventh, the provision of such other improvements in and relating to sluice gates of the type above referred to as are hereinafter described and claimed.

The present device contains many specific improvements in construction and association of the various elements which themselves are a minimum in number, with a resulting decreased cost of manufacture and increased facility of use, it being an object hereof to provide a construction in which the number of operating parts is greatly reduced and which is simple and compact in accordance with the demands and desires of manufacturers and purchasers alike and which is not only distinctive in its appearance and practical in its value but also reliable in its operation and efficient in its use.

Convenience of arrangement of parts, extreme compactness, which is conducive toward the provision of a machine of small proportions, ruggedness and durability are further desirable features that have been borne in mind in the production and development of the present invention.

According to the prior art, one common type of sluice gate has included a frame or support in which a gate is slidable in guideways thereof, there being no particular means for sealing the gate in its closed position. Leakage past the gate has been prevalent and objectionable in such a sluice gate and the operation of the gate between its open and closed positions has been difficult.

Attempts have been made heretofore to provide a sluice gate adapted to obviate this leakage past the gate in the closed position thereof by the provision of coacting metal-to-metal sealing parts. Such obviously requires the accurate machining and fitting of parts so as to unfavorably and objectionally affect manufacturing costs.

Too such coacting metal parts become scored and otherwise unserviceable so that the replacement or reconditioning thereof is made necessary and results in high maintenance costs, a feature which is likewise obviously objectionable.

According to the novel features of this invention, a sluice gate construction is provided which embodies novel sealing means to obviate leakage past the gate in its closed position and at the same time to overcome the numerous objections and disadvantages of the aforesaid common type of sluice gate.

Furthermore, the construction obviates the costly machining of interfitting or relatively slidable metal parts of the aforesaid improved type of sluice gate, and embodies novel sealing means equal thereto, if not superior thereto. Hereby manufacturing and assembling costs, as well as maintenance expenses, are appreciably reduced.

As one feature of the invention, the sealing means of the sluice gate construction not only is efficient for the sealing function but also facilitates ready and easy operation in movements of the gate between its open and closed positions.

Other objects and advantages of the present invention will be in part obvious or in part pointed out more fully hereinafter. All will become apparent as the detailed description of the exemplary form of the invention proceeds below; it being understood that the invention consists substantially in the combination, construction, location and relative arrangement of parts, all as described in detail hereinafter as shown in the accompanying drawing, and with particularity in the appended claims forming a part hereof.

To the accomplishment of these ends, the invention intended to be protected by Letters Patent will be understood to comprise the features set forth in this description and annexed drawing illustrating in detail a certain physical embodiment of the invention and showing parts combined and arranged in accordance with one mode which we have devised for the practical application of the principles hereof.

It will be understood however that this is only indicative of but one of the various ways in which the principles of the invention may be employed and in which the component parts may be combined and arranged. It is not intended to be exhaustive of nor limiting of nor departing from the spirit of the inventino. That is, the precise construction of the figures of the drawing need not be slavishly followed as, of course, the sluice gate may have to be modified in accordance with the use to which it is to be put. Changes, modifications and alterations are contemplated and may be made and resort had to substitutions within the spirit and scope of the claims hereof. No limitations therefore are to be implied from the following specific description. Same is merely given with a view to illustrating and explaining the principles of the invention and their embodiment for practical use, in order that others skilled in the art may be enabled to adapt and modify them in numerous embodiments, variations and modifications, each as may be best adapted to the conditions of any particular use.

That is to say, the objects of the invention may be attained by use of constructions different in certain respects from that disclosed such as in size, form, proportion and the like, all without departing from the underlying principles and scope of the invention and it is understood that such will readily occur to those skilled in the art. The invention is susceptible of same, without departing from the real spirit or scope hereof. Such adaptations and/or changes should be and are intended to be comprehended within the meaning range of equivalence of the claims appended below.

Figure 2:
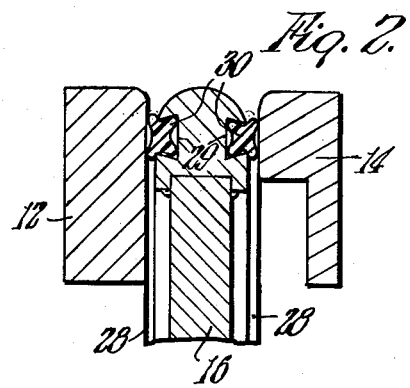
Figure 3:
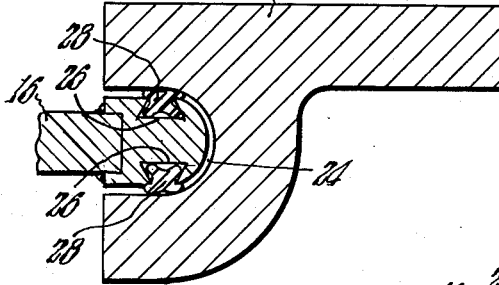
Figure 4:
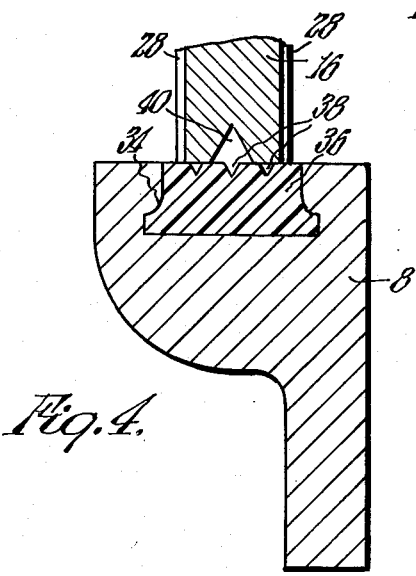
Figure 5:
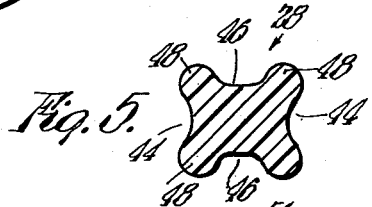
Figure 6:
Figure 7:
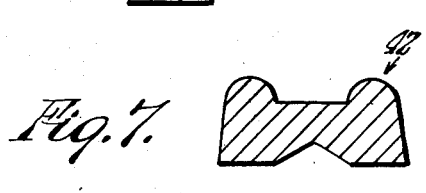

In the accompanying drawing forming part of this specification and which illustrates, by way of example, the principle of the invention and the best mode, which has been contemplated, of applying that principle by way of a construction in accordance therewith, wherein like characteristics of reference or numerals are employed to designate like or corresponding parts throughout the several views:

Fig. 1 is a small scale front elevational view of the sluice gate construction embodying the novel features of the invention;

Figs. 2, 3 and 4 are sectional views on the lines 2—2, 3—3 and 4—4 respectively of Fig. 1;

Figs. 5 and 6 are transverse sectional views through elongated sealing members of the invention; and Fig. 7 is a transverse sectional view through an elongated sealing member for the lower edge of the gate.

In the following description and claims, various details will be identified by specific names for convenience. These names however are intended to be as generic in their application as the art will permit.

Referring now to the drawing forming a part of this specification more in detail, and referring more particularly to the preferred form of my invention selected for illustrative purposes, I have shown a sluice gate which is generally indicated by 2 in Fig. 1 in order that the general relation and utility of the invention components may be better understood.

The sluice gate, in general, includes a frame or support, in which a gate is slidable between lower closed and upper open positions, and operating means for the gate, all hereinafter more fully described.

The frame is composed of transversely spaced vertical side members 4, an upper horizontal transverse member 6 secured to upper ends thereof in any suitable manner such as by bolts (not shown), and a lower transverse member 8.

An intermediate bridge construction 10 includes relatively spaced transverse members 12 and 14 having opposite ends secured to the members 4 by any suitable means. These members are arranged to provide a space therebetween, as shown in Fig. 2.

A gate is indicated by 16, and a spindle 18 has a lower end operatively connected to the upper edge or end of the gate, in the usual manner. The spindle is in threaded engagement with a nut 20 rotatable in the upper member 6. A hand wheel 22 is fixed to the nut. As the hand wheel is turned in one direction or the other, the gate is moved between closed and open positions relative to the frame.

The frame components are arranged for securement in or to the masonry of a sluice way in any well known manner, as is usual in connection with sluice gate constructions.

Inner sides of the side members 4 are provided with longitudinally extending slots or guideways, such as 24 in Fig. 3, in which opposite side edges of the gate may be disposed.

The bottoms of the guideways and the opposite side edges of the gate are preferably semi-circular, as shown, and are arranged for spaced relationship thereof. The upper transverse edge of the gate is also preferably semi-circular, as shown in Fig. 2.

Adjacent opposite side edges of the gate on the front and rear faces thereof, grooves 26 are provided which preferably have inwardly diverging opposite sides, as shown in Fig. 3. Sealing members to be described are disposed in said grooves.

The gate, at its upper end on the front and rear faces and around the opposite side edges thereof, is formed with a continuous groove 29 similar to the grooves 26. A sealing member 30 is disposed throughout said groove 29 and will be described.

The lower member 8 is formed on its upper side with an elongated groove 34 in which is seated an elongated bottom sealing member 36 engageable by the bottom of the gate in the closed position of Fig. 1. It may be desired to provide the member 36 with longitudinally extending serrations 38, and to provide the bottom edge of the gate with one or more grooves, such as 40. Thereby, plural engageable sealing surfaces are provided for the most efficient sealing effect.

In lieu of the sealing member 36, an elongated member 42, having a cross section such as shown in Fig. 7, may be employed in a groove suitably formed therefor. Said bottom sealing member may have various desired cross sectional shapes for cooperating with the lower edge of the gate for the desired sealing function.

The bottom sealing member will be formed from material having sufficient resiliency for sealing purposes, will be resistive to corrosive substances, and will not set due to compression so as to lose its yieldable sealing characteristics.

Various materials may be employed, such as rubber or certain types of synthetic rubber, or foamed plastics of various types each having the desired characteristics of yieldability or resiliency, all as may be desired.

The cross section of the sealing member 28 is clearly shown in Fig. 5. It will be observed to have concave sides 44 and 46 with rounded edges or corners. Otherwise sealing members 50 may be employed which have the cross section of Fig. 6. Said member may be hollow and have a rounded inner side 52 receivable in the grooves, with concave opposite sides 54, and an outer curved face 56 for engaging the guideways.

The sealing members may be formed from a plastic material such as a tetrafluoroethylene resin, or a material having the general characteristics thereof. The product known as Teflon is ideally suited for the purposes hereof.

Such material has a high degree of chemical inertness, is characterized by its low water-absorption properties, is not affected by weathering, has great strength and wear resistance, has a non-sticky surface, is sufficiently yieldable or deformable, and possesses the desired lubricity for the practice of the invention.

The gate 16 is shown in Fig. 1 in its closed position. In such position, the lower edge thereof is in engagement with the bottom sealing member 36. Sealing member 30 engages adjacent inner sides of the transverse members 12 and 14. The side seals 28 engage opposite sides of the guideways 24 of the side members 4.

As shown, opposite side edges of the gate are spaced from the sides of the grooves 24 and opposite faces of said gate are spaced from the members 12 and 14, the sealing members being the only contact between the gate and frame thereby obviating any metal-to-metal contact.

The sealing members are desirably deformable or yieldable. They are so proportioned that, when in the grooves therefor and engaging their respective frame surfaces, they are under some compression so that they are stressed to provide a tight seal. The construction is such that there is adequate sealing against pressure applied to either side of the gate. By being deformed to the desired extent, the inner portions of the seals are securely seated in their respective grooves, all to insure against displacement.

The cross sectional shape of the sealing members may be varied, it being desired that the inner longitudinal portions thereof be deformed to become securely held in the grooves therefor.

The yieldable or deformable characteristics of the sealing members insure the tight sealing function, and the smoothness and lubricity thereof facilitates ready and easy movement of the gate between its closed and open positions.

The fact that the guideways for the edges of the gate have rounded bottoms obviates the likelihood of foreign matter settling in the guideways as would likely occur with guideways having angularly disposed adjacent sides.

It is desired that the frame be formed from separate components which are secured together in a desired and well known manner. The side and bottom members 4 and 8, respectively, and the upper member 6, as well as the members 12 and 14, may comprise aluminum extrusions. Such will be particularly desired from the standpoint of manufacturing costs, inasmuch as the grooves and guideways such as 24 in the members 4, and the required groove 34 in the bottom member 8 may be formed in the extrusion process, thereby to obviate expensive machining operations.

Likewise, the gate may comprise similar extrusions. The upper and side edge portions, as well as the bottom portion thereof, may be extrusions which are secured to the margins of a central flat plate as by welding or the like. To obviate machining costs, the grooves 26 and 29 may be formed in the extruding process as in the case with the grooves of the frame components.

As will be observed, adequate sealing means is provided without the necessity of accurately machined sealing components and their consequent manufacturing costs, all to the end that a sluice gate is provided which is efficient in operation, and may be manufactured at low cost, as compared with prior art sluice gates.

Although our invention has been described and illustrated herein with particular reference to a sluice gate, it should be appreciated that its utility and application extend beyond the particular type of valve mechanism illustrated and its broad scope and concept comprehend the useful and novel features set forth when combined with any valve, and thus, with respect to the scope of the invention, the foregoing material is to be considered as illustrative rather than limiting.

It is to be further understood that the phraseology or terminology employed herein is for the purpose of description and not of limitation. Although specific terms are employed, they are used in a generic and descriptive sense only and not for purposes of limitation.

Without further analysis, the foregoing is intended to so fully reveal the gist of our invention and the construction and operation of the device thereof that others can, by applying current knowledge, readily adapt it for various applications without omitting features which, from the standpoint of prior art, fairly constitute essential characteristics of the generic or specific aspects of this invention. The substitution of equivalents and other modifications are contemplated, as circumstances may suggest or render expedient, since the invention is susceptible of various changes and modifications without departing from the real spirit or underlying principles of the invention. In other words, it is not desired to limit the invention to the exact construction shown and described as the objects of the invention may be attained by the use of constructions different in certain respects from that disclosed.

The following claims are desired to include within the scope of the invention all such suitable variations, modifications and equivalents by which substantially the results of the invention may be obtained through the use of substantially the same equivalent devices or means.

We claim:

1. Sluice gate construction comprising, transversely spaced elongated side members and a bottom member secured to lower ends thereof, a gate for longitudinal sliding movements relative to said side members between lower closed and upper open positions, a transverse bridge extending between said side members including a pair of relatively spaced members for movements of said gate therebetween and positioned to lie at the front and rear faces and at the upper edge of said gate in closed position thereof, said bottom member being provided with a longitudinal slot, a yieldable bottom sealing member in the slot of said bottom member for sealing engagement with the lower edge of said gate in its closed position, said side members being provided on inner adjacent sides thereof with longitudinally extending guideways, said gate at its upper end portion and on the front and rear faces and around the opposite edges thereof being provided with a continuous groove having inwardly diverging opposite sides, yieldable sealing means within said continuous grooves and provided with inner portions deformed in said groove for tight sealing engagement with inner adjacent sides of the spaced members of said bridge in closed position of said gate and spacing said gate from said members, opposite longitudinal side portions of said gate being disposed in said guideways and provided on opposite side faces with longitudinally extending grooves having inwardly diverging opposite sides, and elongated relatively yieldable sealing members having inner portions deformed in said grooves and outer portions in sealing engagement with opposite sides of said guideways spacing said gate therefrom and adapted to facilitate sliding movements of said gate relative to said guideways.

2. Sluice gate construction comprising, a frame including transversely spaced elongated side members and a bottom member secured to lower ends thereof, a gate for sliding movements relative to said side members between lower closed and upper open positions, a transverse bridge extending between said side members including relatively spaced members for movements of said gate therebetween and positioned to lie at front and rear faces and at the upper edge of said gate in closed position thereof, said bottom member provided with a longitudinal slot and a yieldable bottom sealing strip seated therein for sealing engagement with the lower edge of said gate in its closed position, the mating faces of said bottom sealing strip and said lower edge of said gate being grooved, the side members of said frame being provided with longitudinally extending guideways, said guideways being semi-circular in cross-section, said gate at its upper end portion on front and rear faces and around opposite edges thereof being provided with a continuous groove having inwardly diverging opposite sides, a yieldable sealing strip seated in said continuous groove and provided with inner portions deformed in said groove for tight sealing engagement with inner adjacent sides of the spaced members of the bridge in closed position of said gate and spacing said gate from said members, opposite longitudinal side portions of said gate being semi-circular in cross-section and being disposed in said guideways and provided on opposite side faces with longitudinally extending grooves having inwardly diverging opposite sides, and elongated relatively yieldable sealing members having inner portions deformed in said grooves and outer portions in sealing engagement with opposite sides of said guideways spacing said gate therefrom and adapted to facilitate sliding movements of said gate relative to said guideways.

References Cited in the file of this patent

UNITED STATES PATENTS

| | | |
|---|---|---|
| 2,055,512 | Wallace | Sept. 29, 1936 |
| 2,250,524 | Dietrichson | July 29, 1941 |
| 2,643,521 | Hatch | June 30, 1953 |
| 2,654,921 | Blanchard | Oct. 13, 1953 |
| 2,683,354 | Harza | July 13, 1954 |
| 2,889,684 | Abrahams | June 9, 1959 |